M. A. FARRELL.
PIPE COUPLING.
APPLICATION FILED SEPT. 3, 1910.
1,004,004.
Patented Sept. 26, 1911.
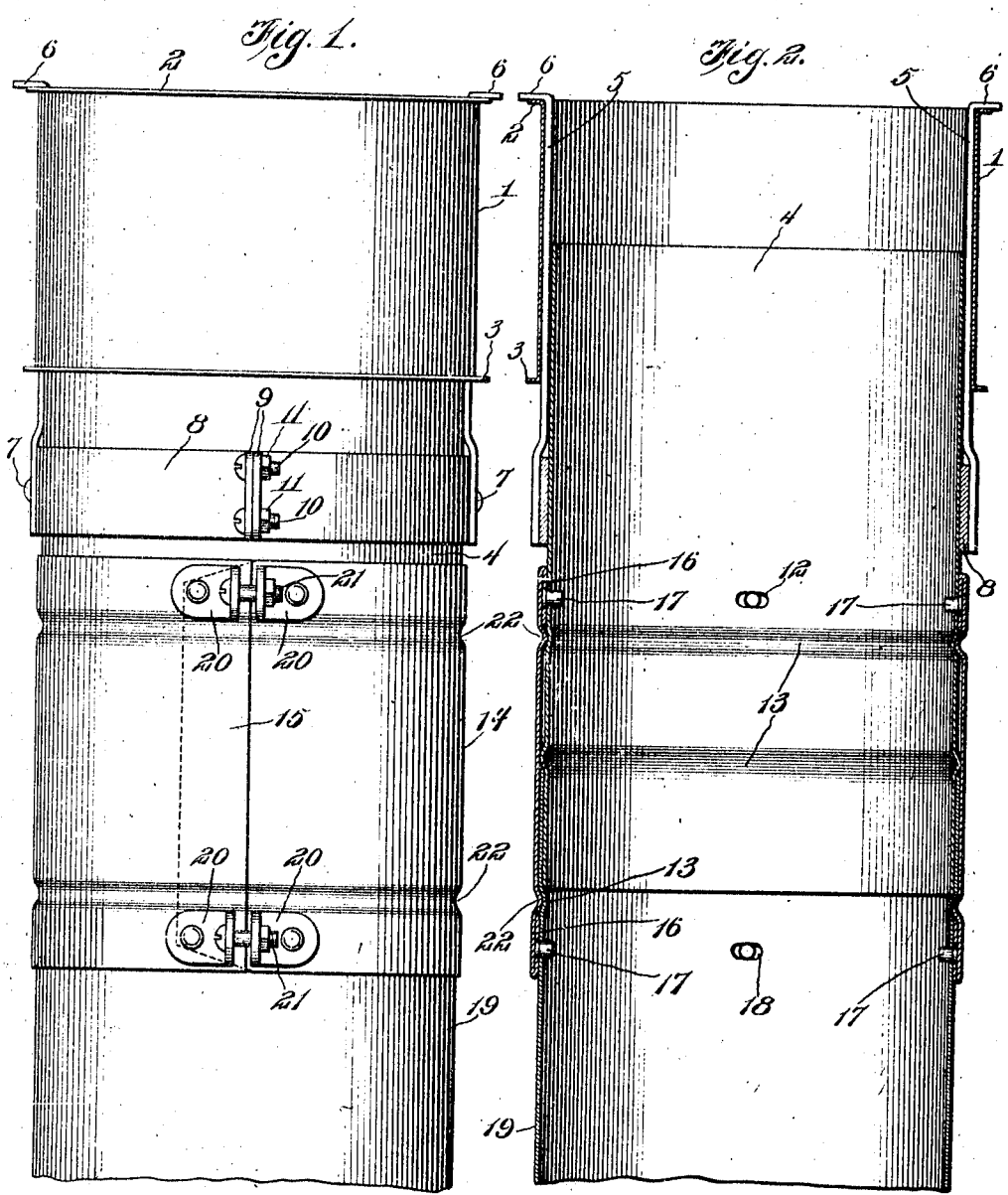
WITNESSES
INVENTOR
Mansfield A. Farrell

UNITED STATES PATENT OFFICE.

MANSFIELD A. FARRELL, OF RATON, TERRITORY OF NEW MEXICO.

PIPE-COUPLING.

1,004,004. 
Specification of Letters Patent. 
Patented Sept. 26, 1911.

Application filed September 3, 1910. Serial No. 580,341.

*To all whom it may concern:*

Be it known that I, MANSFIELD A. FARRELL, a citizen of the United States, residing at Raton, in the county of Colfax and Territory of New Mexico, have invented certain new and useful Improvements in Pipe-Couplings, of which the following is a specification.

This invention relates to pipe couplings, designed more particularly for use in firmly uniting stove pipe and smoke stack joints, but capable of use in connecting steam, water and other pipes, and one of the principal objects of the invention is to provide simple, reliable and efficient means for holding a stove pipe firmly in the chimney, and for connecting on any number of joints without requiring rivets and which will firmly hold the joints in connection.

Another object of the invention is to provide a pipe joint which will permit the removal of any joint within the length of the pipe without disturbing the other joints when required for renewing or repairing any portion of the pipe.

These and other objects may be attained by means of the construction illustrated in the accompanying drawings, in which, Figure 1 is a side elevation of a stove pipe coupling, and a thimble for holding the pipe in the chimney, said coupling and thimble being made in accordance with my invention. Fig. 2 is a vertical section taken through the device as shown.

Referring to the drawings, the numeral 1 designates a thimble designed to be inserted in the smoke hole of the chimney, said thimble being provided with outwardly turned flanges, 2—3, at its opposite ends. A coupling member, 4, is adapted to be inserted at one end within the thimble, 1, and to be held therein by means of metal straps, 5, at opposite sides, said straps having outwardly turned lugs, 6, which engage the edge of the flange, 2. The opposite ends of the straps, 5, are connected by means of rivets, 7, to a metal band, 8, said band having outwardly turned perforated lugs, 9, adapted to be clamped together by means of suitable screws, 10, provided with nuts, 11. The band, 8, is firmly clamped around the coupling member, 4. This coupling member is provided with a series of slots, 12, and may be provided with annular grooves or stops, 13. Connected to the coupling member 4, is a coupling 14, said coupling being disconnected at its edges and overlapped, as shown at 15. The opposite ends of the coupling, 14, are inwardly bent as at 16, and rivets, 17, are secured to the said inwardly bent ends, said rivets projecting inwardly, and adapted to engage at the end in the slots, 12, of the member 4, while at the opposite end, the rivets, 17, extend through slots, 18, in a pipe section, 19. For clamping the coupling, 14, firmly in place, angular clamping members, 20, are riveted near the overlapping edges, 15, and bolts, 21, are passed through the members, 20, and secured by means of a suitable nut, as shown in Fig. 1. Inwardly bent beads or stops, 22, are formed in the coupling, 14, for engaging the grooves or stops, 13, in the member 4 and the section 19.

My coupling can be used for making water-tight or steam-tight joints by inserting a packing at the joints, and clamping the same tightly in place.

I claim:

1. A pipe coupling comprising a band having overlapping edges and clamping means, said coupling having inturned ends, rivets secured to said inturned ends, and adjacent pipe sections provided with slots through which said rivets extend.

2. A pipe joint comprising a coupling having overlapping edges, clamping means on said edges, inturned ends, rivets secured to said inturned ends, said rivets adapted to engage slots in adjacent pipe sections.

In testimony whereof I affix my signature in presence of two witnesses.

MANSFIELD A. FARRELL.

Witnesses:
 DONALD FREASE,
 CHARLES ROHR.